United States Patent [19]

Buttemer

[11] Patent Number: 4,661,799

[45] Date of Patent: Apr. 28, 1987

[54] LOOP DETECTOR

[75] Inventor: David A. Buttemer, Natal, South Africa

[73] Assignee: Electromatic (Proprietary) Limited, Natal, South Africa

[21] Appl. No.: 768,782

[22] Filed: Aug. 23, 1985

[30] Foreign Application Priority Data

Aug. 28, 1984 [GB] United Kingdom ............... 8421715

[51] Int. Cl.⁴ .................................................. G08C 1/00
[52] U.S. Cl. ...................................... 340/941; 340/933; 340/991
[58] Field of Search ............... 340/941, 933, 991, 572, 340/47

[56] References Cited

U.S. PATENT DOCUMENTS 3,891,980 6/1975 Lewis et al. ...................... 340/572
3,996,555 12/1976 Dow ................................... 340/941

Primary Examiner—James L. Rowland
Assistant Examiner—T. Rittmaster
Attorney, Agent, or Firm—Jones, Tullar & Cooper

[57] ABSTRACT

An inductive loop detector which includes a detector which is coupled to the loop by means of a parallel tuned circuit and a receiver which is coupled to the loop by means of a parallel tuned circuit, with the two tuned circuits having different resonant frequencies.

5 Claims, 1 Drawing Figure

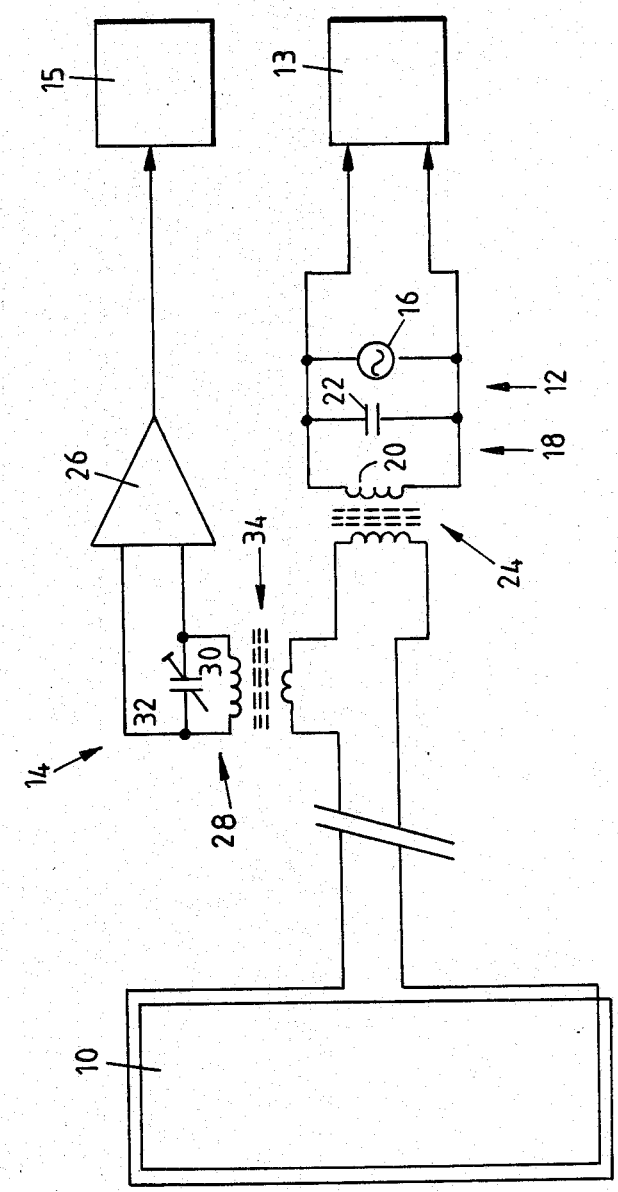

LOOP DETECTOR

BACKGROUND OF THE INVENTION

This invention relates generally to a loop detector of the type used for inductively sensing the presence or passage of a vehicle on a roadway.

Inductive loop vehicle detectors are being used to an increasing extent to detect the passage or presence of road going vehicles of all kinds. However an ancillary detection requirement, which is becoming of increasing importance, is the ability not only to detect a specific class of vehicles such as buses and emergency vehicles within a given area but also to detect specific individual vehicles. For example it is highly desirable to detect an emergency vehicle such as an ambulance in order to achieve traffic priority for the vehicle by favourably controlling the traffic lights at intersections through which the vehicle must pass. It is also necessary, for example to afford to a specific vehicle access to an area, to be able to identify vehicles on an individual basis. This ability may, in addition, be used to bill the responsible person for the use of a toll road, for low enforcement reasons, or for a variety of other purposes.

Specific vehicles of the kind mentioned are equipped with transmitters and inductive loops, buried in the roadways, act as sensors which are responsive to the transmitted signals. The advantage of this system, over other radio-based systems, is that the transmitter must pass over the loop for detection to occur and when this happens the precise location of the vehicle is determinable.

Standard vehicle detection systems currently use one or more buried loops at predetermined locations, e.g. at intersections, or at the approaches to such locations, and the number of loops increases with the complexity of the installation location. It is expensive to install a set of loops and it should be noted that each set of loops requires additional maintenance and care to ensure its continued operation. It should be borne in mind that the loops and feeders constitute the weakest link within a detection system.

It may also not be possible to install an additional loop at a desired location, for sensing a transmitted signal, as an existing detector loop may occupy a desired position. Under these circumstances a compromise installation must be arrived at.

Yet another problem is that the frequency band allocated for the transmitted signals generally falls within the frequency band which has been allocated to vehicle detectors. The detector loop functions as a transmitting element and this can cause interference problems with the receiver loop.

SUMMARY OF THE INVENTION

It is an object of the present invention to provide a solution to the aforementioned problems.

The invention provides a method of operating a loop detector which includes the steps of energizing a loop with a first signal at a first frequency and monitoring the loop to detect a second signal received by the loop at a second frequency which is different from the first frequency.

The loop is energized, for conventional vehicle detection, at a first frequency which is maintained substantially constant or alternatively which is contained within specified frequency limits. The second signal, which is transmitted by a suitably equipped vehicle, is detected by means of a receiver which is selectively responsive to the second frequency.

If the signal at the second frequency is not continually being transmitted by a vehicle then the method of the invention may include the steps, upon detecting the presence of a vehicle, of transmitting an enabling signal by modulating the first signal, detecting the enabling signal on the vehicle, and activating a transmitter on the vehicle to transmit the second signal. Alternatively the detector loop carrier frequency only enables the vehicle transmitter. In general terms therefore a signal is trasmitted to activate the vehicle's transmitter.

The invention also provides an inductive loop detector which includes receiver means which is responsive to a transmitted signal, at a predetermined frequency, detected by the loop.

The receiver means may include a band-pass filter which passes the predetermined frequency. The band-pass filter may include a parallel tuned circuit and preferably is transformer coupled to the loop.

The loop detector operates at a distinct frequency, or alternatively within a given frequency range, which in electromagnetic terms is remote from the predetermined frequency.

According to one variation of the invention the loop detector, upon detecting the presence of a vehicle, transmits an enabling signal to the vehicle causing it to transmit the signal at the said predetermined frequency. In its simplest form the enabling signal is the carrier frequency which is detected by suitable circuitry on the vehicle which then enables a transmitter on the vehicle.

BRIEF DESCRIPTION OF THE DRAWING

The invention is further described by way of example with reference to the accompanying drawing which illustrates the principles of the invention.

DESCRIPTION OF PREFERRED EMBODIMENT

The accompanying drawing illustrates an inductive loop 10 which in practice is buried within a roadway, a front end 12 of a conventional inductive loop detector circuit 13, not shown in detail, and a front end 14 of a receiver circuit 15. The full receiver circuitry is also not shown.

The front end 12 of the detector illustrates schematically an oscillator or exciting source 16 which energizes a parallel tuned circuit 18 consisting of an inductor 20 connected in parallel to a capacitor 22. The circuit 18 is coupled by means of a transformer 24 to the inductive loop 10.

The front end 14 of the receiver includes an amplifier 26 which is connected across the terminals of a second parallel tuned circuit 28 consisting of an inductor 30 and a tuning capacitor 32. The circuit 28 is coupled by means of a transformer 34 to the inductive loop 10.

The loop detector functions in a normal manner and therefore is not described in detail in this specification. The source 16 energizes the loop 10 at a frequency determined by the circuit 18. Ideally this frequency is maintained constant, within practical limits, or alternatively kept within a tightly prescribed frequency band. A vehicle which traverses the loop 10 or which otherwise comes within its sphere of electromagnetic influence attempts to alter the frequency of oscillation and under these conditions, in accordance with conventional practice, a control signal is generated which restores the energizing frequency of the loop to its desired value. The control signal is then a measure or an indicator of the presence of the vehicle.

In accordance with the invention the circuit 28 of the receiver is tuned to the frequency which is allocated in the particular instance to transmitters carried on board emergency or other selected vehicle types or specific individual vehicles. This frequency is remote, in electromagnetic terms, from the energizing signal which is applied to the inductive loop 10. As the circuit 28 is parallel tuned it has a high impedance at its resonant frequency but a low impedance at other frequencies. Thus the impedance of the receiver input to the inductive loop has a negligible effect on the energizing signal applied to the inductive loop.

In similar way the parallel tuned circuit 18 inputs an impedance to the inductive loop which has only a minor effect on a transmitted signal detected by the inductive loop when the frequency of the transmitted signal is remote from the resonant frequency of the circuit 18.

It follows therefore that the detector can function in the normal manner to energize the loop 10 and detect the presence or passage of vehicles over the loop. Transmitted signals received by the loop have no significant effect on the detector. On the other hand such signals are efficiently coupled to the receiver because of the band-pass filter effect of the circuit 28 but the loop energizing signal is effectively rejected by the circuit.

The invention thus makes it possible for a single loop to be used in a general vehicle detector, and to form the basis for detecting specific transmitter-equipped vehicles.

In certain situations it is not permitted to operate a transmitter on a vehicle continuously. Under these conditions the presence of the vehicle can be detected in the normal manner by means of the detector and, upon such detection, the energizing source 16 can be modulated to transmit an enabling signal to detector means on the vehicle. For example the source 16 can be pulse-code modulated so that the loop 10 is energized for a succession of short time intervals. Upon detection of this signal by a detector on the vehicle a transmitter on the vehicle is enabled and the transmitted signal is received by the receiver in the manner described. Appropriate action can then be initiated by the receiver. In a variation of the invention the loop detector carrier frequency alone can be used to enable the transmitter i.e. without resorting to modulating the source 16.

It is reiterated that the system of the invention is particularly suitable for use with a fixed frequency loop detector. However it operates effectively with loop detectors which have free running front ends provided the loop frequency can be contained within specified limits.

I claim:

1. A method of operating a loop detector which includes the steps of energizing a loop with a first signal at a first frequency, monitoring the first signal to detect the presence of a vehicle within the electromagnetic area of the loop, and upon so detecting the presence of a vehicle, of transmitting a signal to the vehicle to activate a transmitter on the vehicle, the transmitter transmitting a second signal at a second frequency which is different from the first frequency, and monitoring the loop to detect the second signal.

2. A method according to claim 1 which includes the step of maintaining the first frequency within specified frequency limits.

3. A method according to claim 2 wherein the first frequency is maintained substantially constant.

4. An inductive loop detector which includes an inductive loop, means for energizing the loop with a first signal at a first frequency, the first frequency being maintained within specified frequency limits, means for monitoring the first signal to detect the presence of a vehicle within the electro-magnetic area of the loop, and receiver means which is responsive to a signal transmitted from a vehicle and detected by the loop, the transmitted signal being at a second frequency which is different from the first frequency.

5. An inductive loop detector according to claim 4 wherein the loop energizing means includes a first parallel tuned circuit which is resonant at the first frequency and which couples the first signal to the loop, and the receiver means includes a receiver, and a second parallel tuned circuit which is resonant at the second frequency and which couples the receiver to the loop.

* * * * *